United States Patent [19]

Lagoutte

[11] Patent Number: 4,999,835
[45] Date of Patent: Mar. 12, 1991

[54] METHOD AND DEVICE FOR ASYNCHRONOUS MODE TRANSMISSION PUTTING MICROCELLS INTO USE

[75] Inventor: Pierre Lagoutte, Issy les Moulineaux, France

[73] Assignee: LMT Radio Professionnelle, Boulogne Billancourt, France

[21] Appl. No.: 388,001

[22] Filed: Aug. 1, 1989

[30] Foreign Application Priority Data

Aug. 5, 1988 [FR] France ............................. 88 10613

[51] Int. Cl.$^5$ ............................................. H04J 3/24
[52] U.S. Cl. ..................................... 370/94.1; 370/60
[58] Field of Search .................. 370/94.1, 60, 94.3, 370/118

[56] References Cited

U.S. PATENT DOCUMENTS 4,707,831  11/1987  Weir et al. ............................. 370/60
4,731,785  3/1988  Ferenc et al. ......................... 370/60

OTHER PUBLICATIONS

Proceedings International Switching Symposium, Paris, May 7-11, 1979, pp. 757-764, Paris, France; Y. Ikeda et al.; "Virtual Circuit Switching System: A New System Concept for Telephony and Data Integration".
Proceedings International Conference on Communications, Seattle, Jun. 7-10, 1987, pp. 1585-1592, IEEE, Seattle, Wash., U.S.A., L. T. Wu et al.; "Dynamic TDM—A Packet Approach to Broadband Networking"
8272, IEEE Journal on Selected Areas in Communications, vol. SAC-5 (1987), Oct., No. 8, New York, N.Y., U.S.A., pp. 1222-1230, D. R. Spears; "Broadband ISDN Switching Capabilities from a Services Perspective".
Proceedings IEEE International Conference on Communications, Seattle, Jun. 7-10, 1987, vol. 1, IEEE, Seattle, Wash., U.S.A.; S. E. Minzer; "Broadband User-Network Interfaces to ISDN"; pp. 364-369.
Proceedings IEEE International Switching Symposium, Phoenix, Mar. 15-20, 1987, pp. 462-469, IEEE, Phoenix, U.S.A.; M. Wm. Beckner et al.; "A Protocol and Prototype for Broadband Subscriber Access to ISDNs".

Primary Examiner—Douglas W. Olms
Assistant Examiner—H. Kizou
Attorney, Agent, or Firm—Oblon, Spivak, McClelland, Maier & Neustadt

[57] ABSTRACT

In asynchronous mode transmission for multiple-service networks with a wide range of throughput rates, it is stipulated that the digital data will be conveyed in standard cells having a header and a data field, with fixed lengths. For the low throughput rate services, which are penalized by this type of transmission as regards their transmission efficiency, the method disclosed provides for the transmission, while performing all the switching operations on the standardized cells, of microcells on those trunk lines where this type of transmission occupies a major place. These microcells result from the cutting up of the standardized cells, preventing the transmission of unnecessary data field lengths.

10 Claims, 1 Drawing Sheet

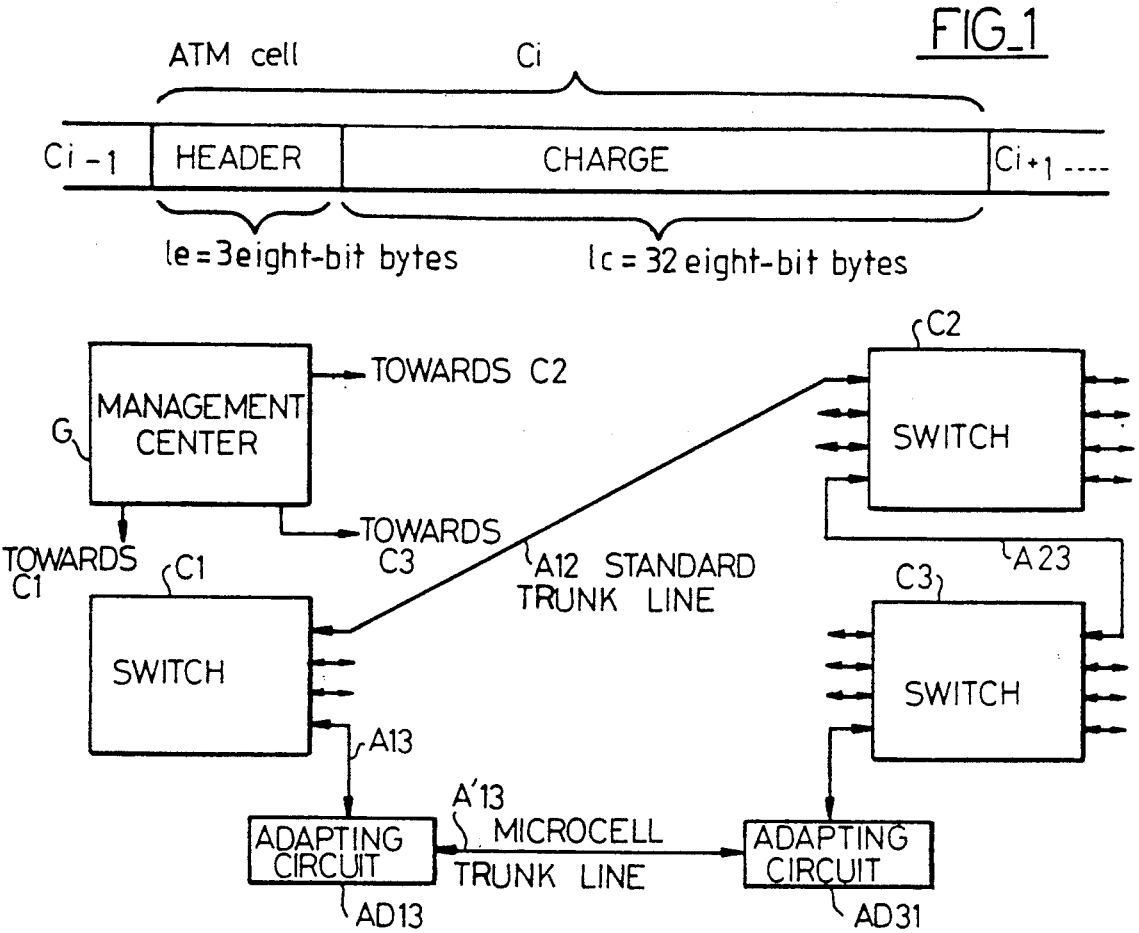
FIG_1
FIG_2
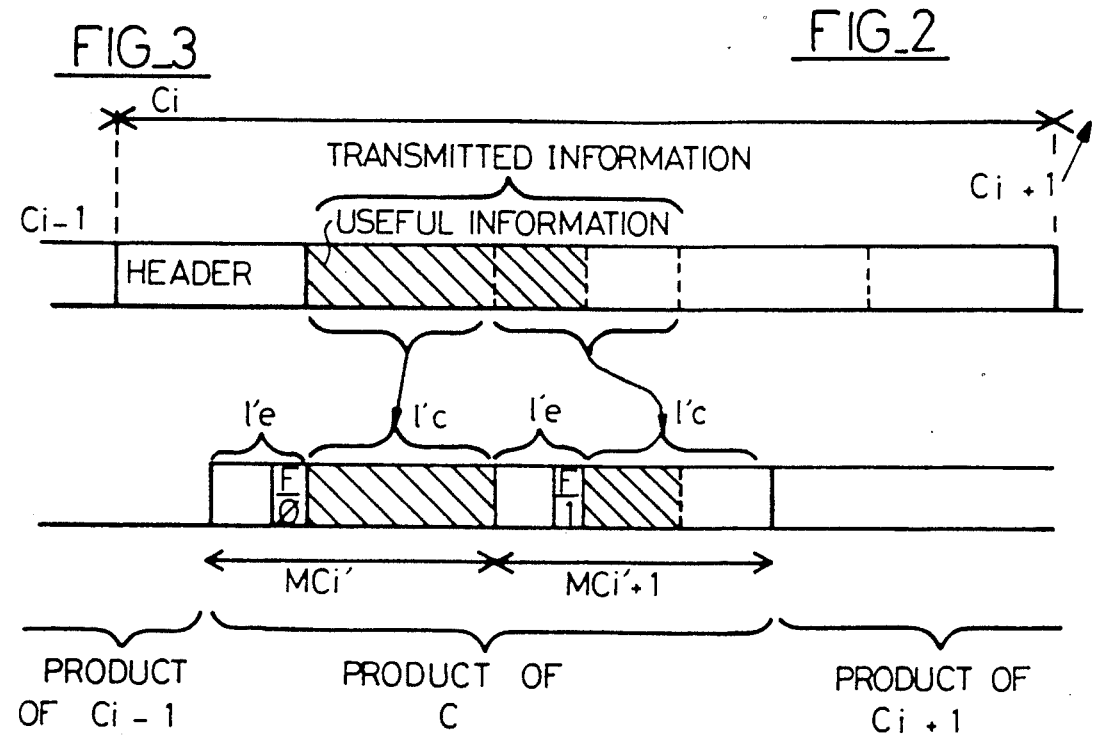
FIG_3

METHOD AND DEVICE FOR ASYNCHRONOUS MODE TRANSMISSION PUTTING MICROCELLS INTO USE

BACKGROUND OF THE INVENTION

1. Field of the Invention

The invention pertains to the field of telecommunications, in particular to broadband integrated services digital networks or "broadband ISDN", namely multiple service networks with a wide range of throughput rates, which may extend from the transmission of high-definition digital television at 150 megabits per second to the transmission of short spoken messages, for example for civilian or military applications, where the speech is encoded by linear predictive coding, for example LPC10, using 2400 bits/s vocoders.

2. Description of the Prior Art

For broadband integrated services digital networks, an international conference has chosen the asynchronous mode for the transfer of data, namely a transfer in cells of fixed lengths, comprising a header and a useful data field. The header has a length of 3 to 5 eight-bit bytes while the useful data field will have a length ranging from 32 to 120 eight-bit bytes. Once the characteristics of the network have been defined, these lengths will be fixed. The final decision on the respective lengths of the header and the useful data field should give the most advantageous compromise for the transmission quality to be acceptable, with delays and losses of information being reduced to a minimum. To optimize the transmission efficiency, the ratio between the size of the header and the size of the useful data field should enable the proper transmission of all the services envisaged. But irrespectively of the final values chosen, it is clear that the transmission efficiency will not be at a maximum for links with low throughput rates, given the fact that the cells will not be completely filled for this type of transmission. If $l_e$ is the length of the header, and if $l_c$ is the length of the data field, u being the length of the useful information transmitted in a cell, the efficiency of the transmission function is measured by $e = u/(l_c + l_e)$. For low throughput rate data such as speech encoded in 2400 bits/s, $u = 4$ eight-bit bytes, i.e. the packaging will correspond to a duration of speech of 14 milliseconds. If we use a standard cell such as the one shown in FIG. 1, wherein the length of the header $l_e$ is equal to 3 eight-bit bytes, and wherein $l_c$ is equal to 32 eight-bit bytes (the minimum length stipulated in the international recommendation), the transmission efficiency for this type of data is 12%.

Consequently, a network in which the transfer of data is done in an asynchronous mode actually enables these different types of information to be transmitted in cells of fixed length, the information being distributed in a sequence of cells, when necessary at high throughput rates, the cells being filled only partially, when necessary at low throughput rates. However, for low throughput rate links, a cell is transmitted and then routed through the different junctions of the network only when it is entirely received at the network. This leads to a transmission efficiency which is lower than that obtained when the cell is completely filled, owing to the "packaging" time. In other words, the transmission of data at a low throughput rate is done with a certain delay.

For certain types of services, this kind of transfer entails no drawbacks. On the other hand, this transfer in an asynchronous mode may be troublesome for low throughput rate links wherein transmission in real time is desired, for example for tactical links or for links useful in aeronautics.

SUMMARY OF THE INVENTION

An object of the invention is a method, and the corresponding device, for transmission in an asynchronous mode, enabling this drawback to be reduced, by putting microcells to use.

The transmission method, compatible with the format provided for the cells used in an transmission in asynchronous mode, is such that the pieces of information at low throughput rates and in real time are "packed" in smaller cells, hereinafter called microcells, on the trunk lines or main lines where the proportion of this type of communication is great.

The invention proposes a method for transmission, in an asynchronous mode, for a multiple-service network with a wide range of throughput rates, respectively associated with the different services, of digital data conveyed in cells of pre-defined length, each formed by a header and a data field, wherein, to convey, with suitable transmission efficiency, the communications at low throughput rates and in real time, the method consists in the performance, at one end of a trunk line or main line, after switching, of a conversion of the transmission cells into microcells of smaller length having a data field length resulting from a whole number division of the charge length of the cells, and a header of proportionate length, the header having an indicator which changes status for the microcells conveying the last items of useful data of the charge of a cell and, at the other end of the trunk line, before switching, a reverse conversion to restore the standardized cells to the switch.

BRIEF DESCRIPTION OF THE DRAWINGS

The invention will be better understood and other characteristics will emerge from the following description made with reference to the appended FIGURES, of which:

FIG. 1 shows the format of a cell for the transfer of information in an asynchronous mode;

FIG. 2 is a diagram of the transmission device according to the invention;

FIG. 3 illustrates the transmission method putting into use the microcells according to the invention.

DESCRIPTION OF THE PREFERRED EMBODIMENT

FIG. 1 shows the data transfer cell $C_i$ and the above-described lengths $l_e$, $l_c$ and u, for an asynchronous transfer mode (ATM).

FIG. 2 schematically shows how the invention is put into use in a data transfer network.

A management center G controls the transfer of the data in the network from different sources of data (not shown) in routing them to the different trunk lines $A_{12}$, $A_{13}$ $A_{23}$ . . . of the network linking up switches $C_1$, $C_2$, $C_3$. According to the invention, the trunk lines adapted to the transfer of data in ATM in pre-defined data transfer cells $C_i$, will be provided, at both their ends, with adapting circuits when the proportion of the low throughput rate/real time communications that they have to transmit is high. In FIG. 2, it has been assumed that the trunk line $A_{13}$ is a trunk line of this type, and two adapting circuits $AD_{13}$ and $AD_{31}$ have been provided on this trunk line, the data being transferred, between these two adapting circuits on the trunk line $A_{13}$, in microcells, i.e. in cells that are smaller than those defined for the transfer in the network.

Generally, for the cells $C_i$, $l_c$ is equal to $2^n$. The microcells MC which are formed by the adapting circuits from the cells $C_i$ will have a data field length of $l'_c = l_c/2^k$, where k is smaller than n, with a header of a proportionate length $l'_e$. For example, for $l_c = 2^5 = 32$ eight-bit bytes, k being chosen to be equal to 2, $l'_c = 2^5/2^2 = 2^3 = 8$ eight-bit bytes. This amounts to distributing the data field length of a cell $C_i$ among, at the most, 4 microcells with a data field length of 8 eight-bit bytes. The useful data field is then cut up to be transmitted in these microcells. When the entire useful information field has been cut up, the microcell having the last pieces of useful information of a standard ATM cell $C_i$ is marked in its header by a particular signal F. $F=0$ for all the microcells except for the last microcell where $F=1$, among the $2^n$, the others being not transmitted since they are empty.

This method of setting up microcells with standardized cells is shown in FIG. 3, where k is chosen to be equal to 2: since the cell $C_i$ is filled to less than 50% but more than 25%, the useful information field is cut up and inserted in the useful data fields of two microcells $MC_i$ and $MC_{i+1}$. Thus, after this second microcell, microcells produced from the following cell $C_{i+1}$ can be transmitted, and the efficiency of the transmission on the corresponding trunk line, thus equipped, is substantially increased.

This method calls for the extraction, throughout the system and, notably in the management means, of particular data pertaining to the filling of the cells: a communication of a given type (depending on the service provided) filling its cells only upto a maximum, of eight-bit bytes, which is known to the network when the call is set up, for example, $u=20$ eight-bit bytes, will be routed preferably through trunk lines provided with adapting circuits that produce, from standard cells, microcells having data field lengths of $2^{n-k}$ eight-bit bytes, namely 4 (or 8) eight-bit bytes, for example, u being then distributed among 5 (or 3) microcells.

The adapting circuits that perform the cutting operation and, in reverse, the reconstruction of standard cells in the trunk lines, are transmission adapting circuits located outside the switches They are pure hardware (including no software) and may be included either in transmission equipment, for example directional radio links for long-distance communications, or in the junction cards of switches. The switches control the adapting circuits at their incoming and outgoing trunk lines, in indicating the characteristics of the flow to be cut up in the headers of the cells to be cut up, three bits being reserved for this purpose in the headers of the standard ATM cells.

For the switching function, the switches switch over only standard ATM cells.

It is possible to place these adapting circuits on only certain trunk lines, or to place them on all the trunk lines, where they would be active only when the corresponding bits of the header produce the necessary cutting up, directly by wiring.

What is claimed is:

1. A method for the transmission, in an asynchronous mode, for a multiple-service network with a wide range of throughput rates, respectively associated with the different services, of digital data conveyed in cells of a pre-defined length, each cell formed of a header and a data field, wherein, to route, with a suitable transmission efficiency, the communications at low throughput rates and in real time, the method comprises in the performance, at one end of a trunk line or main line, after switching, the steps of converting the transmission cells in to microcells of smaller length having a data field length resulting from a whole number division of the data field length of the cells, and a header of proportionate length, said header having an indicator which indicates the last microcell having a data field with information and, at the other end of the trunk line, before switching, reverse converting to restore the standardized cells to the switch.

2. A method according to claim 1, wherein the header of the cells to be converted into microcells includes the characteristics of the flow of data to be transmitted in these cells.

3. A method according to claim 1 or 2, wherein on the trunk lines of the network designed to transmit a major proportion of communications at low throughput rate and in real time, adapting circuits are provided at both ends of a trunk line between two switches converting the standardized transmission cells into shorter microcells after a switch and, conversely, the microcells into standardized cells before a switch.

4. A method according to claim 3, wherein the adapting circuits are located in the transmission equipment of the ends of the transmission trunk lines.

5. A method according to claim 3, wherein the adapting circuits are located in the junction cards of the switches to the trunk lines.

6. A method for the real-time asynchronous transmission of low throughput digital data signals conveyed in cells, each cell formed of a header of a first predetermined length and a data field of a second predetermined length, in a multiple-service network for transmitting signals with a wide range of throughput rates, comprising the steps of:
  switching said low throughput digital data signals conveyed in cells into a conversion circuit;
  converting said low throughout digital data signals conveyed in cells into microcell signals, each microcell having a header and a data field, the length of the data field being a whole number division of said second predetermined length, said header having an indicator which indicates the last microcell having a data field with information;
  transmitting said microcell signals along a transmission path;
  reconverting said microcell signals into the low throughput digital data signals conveyed in cells at the end of the transmission path.

7. The method according to claim 6, wherein the header of the cells to be converted into microcells includes the characteristics of the flow of the data to be transmitted in these cells.

8. A system for the real-time asynchronous transmission of low throughput digital data signals conveyed in cells, each cell formed of a header of a first predetermined length and a data field of a second predetermined length, in a multiple-service network for transmitting signals with a wide range of throughput rates, comprising:
  a switch for switching said low throughout digital data signals conveyed in cells into a conversion circuit;

a converter for converting said low throughput digital data signals conveyed in cells into microcell signals, each microcell having a header and a data field, the length of the data field being a whole number division of said second predetermined length, said header having an indicator which indicates the last microcell having a data field with information, wherein said microcell signals are transmitted along a transmission path and are reconverted into the low throughput digital data signals conveyed in cells at the end of the transmission path.

9. A device according to claim 8, wherein the converter is located in transmission equipment of ends of transmission trunk lines of the multi-service network.

10. A device according to claim 8, wherein the converter is located in junction cards of switches to trunk lines of the multi-service network.

* * * * *